(12) United States Patent
Vilar et al.

(10) Patent No.: US 8,203,749 B2
(45) Date of Patent: Jun. 19, 2012

(54) PRINTING DEVICE, CARRIAGE AND COLOR MEASUREMENT METHOD

(75) Inventors: Jordi Vilar, Sant Cugat del Valles (ES); Ignacio Ruiz de Conejo, Sant Cugat del Valles (ES); Jordi Arnabat Benedicto, Sant Cugat del Valles (ES); Juan Uroz, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1005 days.

(21) Appl. No.: 11/453,973

(22) Filed: Jun. 16, 2006

(65) Prior Publication Data
US 2007/0291291 A1  Dec. 20, 2007

(51) Int. Cl.
*G06F 15/00* (2006.01)
*H04N 1/46* (2006.01)

(52) U.S. Cl. .......................................... 358/1.9; 358/504

(58) Field of Classification Search ................. 358/504, 358/1.8, 1.9; 347/85, 86, 97, 81
See application file for complete search history.

(56) References Cited

U.S. PATENT DOCUMENTS

| | | | | |
|---|---|---|---|---|
| 5,434,604 A | * | 7/1995 | Cleary et al. | 347/19 |
| 6,081,344 A | | 6/2000 | Bockman et al. | |
| 6,113,228 A | * | 9/2000 | Pawlowski et al. | 347/81 |
| 6,404,517 B1 | | 6/2002 | Chao | |
| 6,684,035 B2 | * | 1/2004 | Furno et al. | 399/49 |
| 7,069,164 B2 | * | 6/2006 | Viturro et al. | 702/85 |
| 2005/0018219 A1 | * | 1/2005 | Senn et al. | 358/1.8 |
| 2006/0072170 A1 | * | 4/2006 | Kawakami et al. | 358/504 |
| 2006/0170991 A1 | * | 8/2006 | Jacob et al. | 358/504 |

FOREIGN PATENT DOCUMENTS

| | | |
|---|---|---|
| EP | 1 215 887 A2 | 6/2002 |
| EP | 1 571 826 A2 | 9/2005 |
| GB | 2 409 122 A | 6/2005 |

* cited by examiner

*Primary Examiner* — Benny Q Tieu
*Assistant Examiner* — Sunil Chacko (57) ABSTRACT

The invention relates to a color printing device, whereby the color printing device comprises a reciprocating color measurement device and a reciprocating optical density sensor, to a mobile carriage comprising a color printhead, a color measurement device and an optical density sensor and to a color measurement method comprising the following steps: identify the position of a pattern on a two-dimensional media using a mobile optical density sensor; derive the position of a color patch on the media from the position of the pattern; measure the color of the color patch using a color measurement device.

19 Claims, 6 Drawing Sheets

PRINTING DEVICE, CARRIAGE AND COLOR MEASUREMENT METHOD

BACKGROUND OF THE INVENTION

Color management is becoming more and more important since nowadays not only professional designers and illustrators but also average consumers wish to reproduce color as faithfully as possible by means of their electronic color output devices. This development is, among other things, the consequence of a rapidly increasing number of users taking pictures with digital cameras and printing the pictures, e.g. with their desktop color inkjet printers. One crucial point in terms of color management is that each color recording or reproducing device has its own device-dependent color space by reference to which it records or reproduces colors. For example, two digital cameras of different manufacturers taking the same picture under the same lighting conditions will store different RGB-values in their memory due to the differences between their photo-sensors, lens-systems and color processing firmware. Therefore, in order to be able to compare RGB-values of different color input devices, the colors are integrated into one device independent color space, which is usually the CIE (Commission Internationale de l'Eclairage)-LAB-color space or the CIE-XYZ color space. Another example would be two color inkjet printers of two different manufacturers operating in a CMYK-color space having the primaries cyan (C), magenta (M), yellow (Y) and black (K). If the same CMYK-values are sent to the different color printers, different colors will appear on the print medium with regard to the LAB-color space. The LAB-values of color patches printed on a print medium can be measured e.g. with a spectrophotometer which yields the LAB-color values of the color patches. A patch should be understood as a region of the media which is uniformly filled with a color.

If LAB-values of some color patches are measured, the printer-related CMYK-values of which are known, LAB-values can be determined for all possible CMYK-values by means of a mathematical transformation. To this end, color values are transformed from the device-dependent color values (e.g. RGB-color space of a scanner or digital camera) into the device-independent color values of the LAB-color space. This transformation may be encapsulated by means of an ICC profile which represents a mapping from the device-dependent color space of a color device into the LAB-color space and vice versa. The transformation can be later performed by a Color Management Module, or CMM. To this end, a "neutral observer" is applied which is able to measure a color in the LAB-color space. This neutral observer is typically a calorimeter which uses filters that mimic the neutral observer's response or a spectrophotometer which measures the wavelengths of the reflected light of color patches and calculates the corresponding LAB-color values. The reflected light is typically produced by a controlled light source of known characteristics. Typically, a spectrophotometer is an external device, which measures the device-independent LAB-color values of a set of color patches. The spectrophotometer typically is a handheld device. Typically, a spectrophotometer would measures spectra, Lab (or an other calorimetric representation) which may be calculated by means of an evaluation of the reflectance spectrum in view of the spectrum of a given illuminant.

A set of color patches printed by a color output device on the basis of known device-dependent color values is also referred to as a "target". If the color patches have been produced, e.g. by an inkjet printer having its own CMYK-color space, whereby a point in the CMYK-color space represents a corresponding mixture of the four different inks cyan, magenta, yellow and black, then the CMYK-color points associated with the color patches can be assigned to the measured LAB- or XYZ-values of the patches to obtain a profile. In this context, the color values provided to the color output device are also referred to as "stimulus" and the color patches printed are referred to as "response" of the color output device to the color values. Thereby, a mapping is defined which maps the device-dependent color values (e.g. CMYK values) to the LAB- or XYZ-values of the color patches measured by a spectrophotometer. This mapping is often represented in the form of a matrix or a lookup-table (LUT), whereby a lookup-table representing a mapping from a device-dependent color space into a device-independent color space is usually referred to as "AtoB"-mapping, and a mapping from the device-independent color space into the device-dependent color space is usually referred to as "BtoA"-mapping. Often, a target has less color patches than a lookup-table has entries. Then, an interpolation of the measured color values is performed to populate the whole set of entries in the LUT.

Generally, the question arises how to measure color values of color patches. To this end, printing devices have been introduced which integrate an embedded color measurement device.

In U.S. Pat. No. 6,809,855 B2 an "improved and lower cost color spectrophotometer" is described, which is integrated in a color printer for on-line continuous color correction purposes.

US 2002/0080373 A1 describes a proofing printer with an embedded color measurement device for emulating a high volume output device. To this end, a target ("test image") printed by the proofing printer is measured first to calibrate the proofing printer ("color calibration adjustments"), and then a target printed by the high volume output device is measured to modify the proofing printer's calibration so that it emulates the high volume output device ("color management adjustments").

US 2005/0018219 A1 describes a digital printer with a built-in color measurement device in the form of a calorimeter or spectral photometer.

GB 2 409 122 A describes a printer, whereby a spectrophotometer is located within the printer.

DESCRIPTION OF THE DRAWINGS

Embodiments of the invention will now be described, by way of example, and with reference to the accompanying drawings, in which.

DESCRIPTION OF EMBODIMENTS

Figure 1:
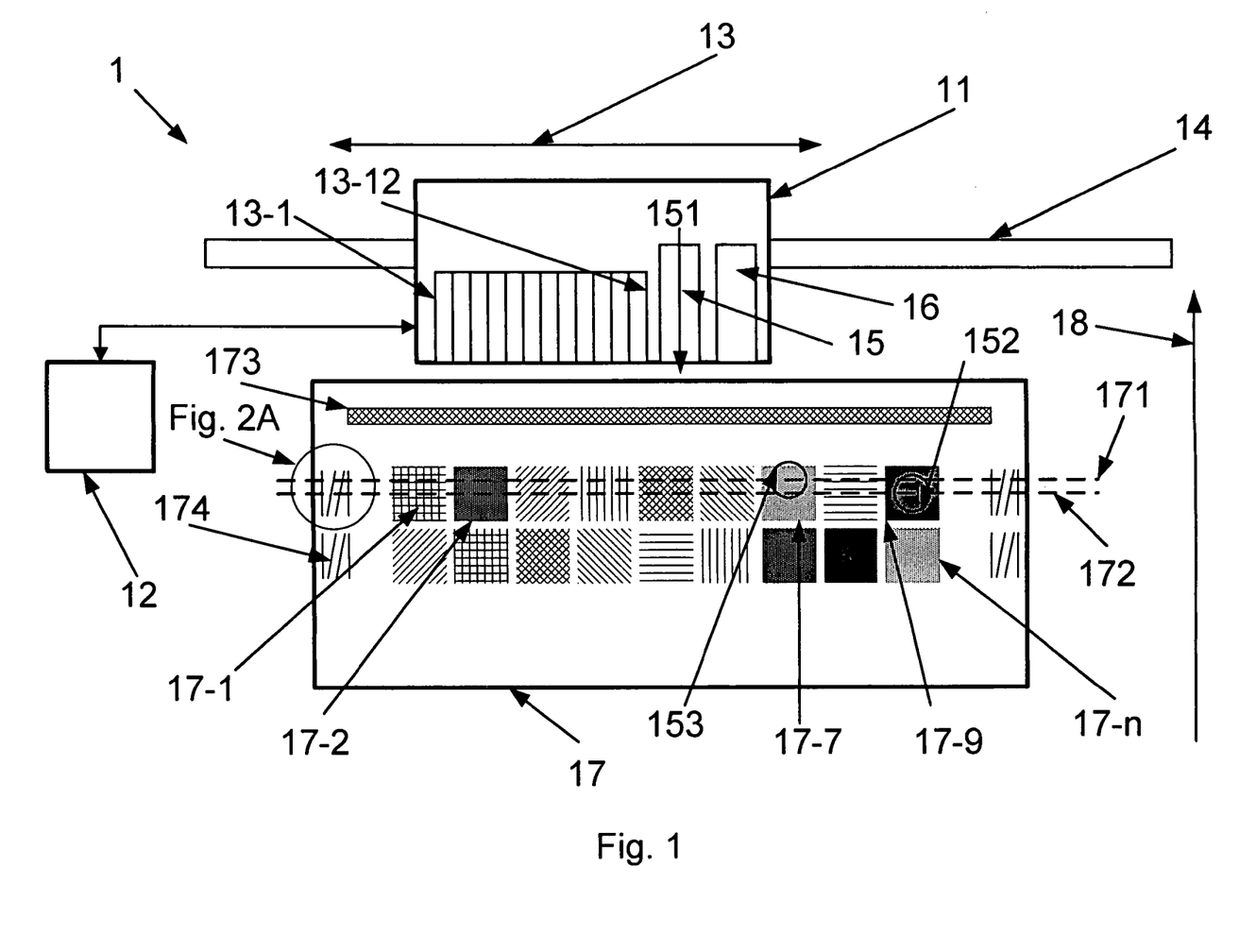
FIG. 1 illustrates a printing device with a reciprocating carriage comprising a color measurement device and an optical density sensor, according to embodiments of the invention.

FIG. 1 illustrates a printing device with a reciprocating carriage comprising a color measurement device and an optical density sensor. However, before proceeding further with the description of FIG. 1, a few items will be discussed.

A color gamut is the entire range of colors reproducible by a particular printing device (e.g. a color inkjet printer under specific printing conditions, such as a certain medium, inkset and printmode). "Out-of-gamut" colors are colors that are not reproducible under those conditions. A gamut surface is the surface of a volume which includes all reproducible colors, in a color space. A gamut surface thus separates the color-space region of the reproducible colors from that of the out-of-gamut colors.

In some of the embodiments, a printer is provided which is arranged to render color images on print media and which has a color gamut. The printer includes an embedded color measurement device (also called embedded color measurement device) which is arranged to measure colors in a device-independent color space which are printed by the printer on a print medium.

The term "print medium" or "two dimensional media" as used herein refers to any types of paper, such as glossy, semi-gloss or coated paper, different types of transparencies, cardboard, canvas, and any other substance on which a printer can print.

The term "colorant" or "ink" refers to dye ink, pigmented ink, toner, color-coated film for thermal printers or any other substance which can be applied to a print medium.

The term "printer" or "printing device" as used herein refers to any sorts of inkjet printers, printing presses, color laser-jet printers, thermal printers or any other devices which are able to print color on a print medium.

In some of the embodiments, a "color measurement device" or "color measurement device" is a calorimeter or spectrophotometer. Colorimeters directly measure colorimetric values by suitable color filters that mimic the human cone response, and produce numerical results in a color space (e.g. CIE LAB) for a fixed given illuminant. Spectrophotometers measure the spectral power distribution (SPD) across the entire spectrum relative to the light source used, and process the data representing the measured spectrum in function of the illuminant such that the response to the spectrum by the cones in our eyes is simulated, and again output numerical results in a color space, as well as the SPD (see for example: B. Fraser et al., "Real World Color Management", Peachpit Press, 2003, p. 43-44).

The set of color patches whose color values (in the color space of the printer) are known is referred to, especially in the context of color management systems, as a "color target". The targets are created by presenting different color codes that span the printer's color print range, i.e. combinations of different amounts of the different colorants to the printer in an array that samples the range of possible combinations of the colorants. Thereby, the printer is caused to print a variety of different colors defined by the color codes. The inks are, for example, CMYK; thus, the color codes are expressed in the (device-dependent) CMYK color space. There are also printers using more than four inks, some of which additionally provide a light cyan and a light magenta, thereby operating in a CMYKcm color space, and printers equipped with inks of the four subtractive primary colors plus orange and green inks. These printers refer to a CMYKOG color space, whereas still other printers even operate in a CMYKcmOG color space. The presentation of the set of color codes (i.e. all the different combinations of CMYK-inks) to the printer is therefore referred to as a "stimulus". A response is obtained by measuring the colors of the different color patches with a spectrophotometer or calorimeter. In the usual characterization procedure such a measurement is used to construct a "profile" or to linearize the printer by associating the measured LAB- or XYZ-color values to the known CMYK values (e.g. in US 2002/0080373 A1). The forward table of such a profile indicates what actual colors will result from a given set of CMYK-values, while the reverse table of the profile stores the inverse mapping, from actual colors to CMYK-values, and is normally used to tell a printer what to print.

In some of the embodiments, the printer is arranged and programmed to automatically carry out the following chain of activities, without manual user intervention: first, a target is printed. Then, the colors of the color-patch set are measured, either immediately or after an ink-drying delay (e.g. one hour, which also allows for color stabilization of the patches), and a gamut model for that printed target is formed. A gamut model is an approximation of a real gamut for a device. One should note that in practice, the printer does not "know" the exact position of the patches printed on the media, due to imperfections which may be due to the printing process, to the measuring process, or to the placement of the media, for example. This implies that fiducials should be introduced in order to allow for a positioning reference facilitating measurement. In the case of an ink-drying delay, the medium with the target printed on it can be left in the printer (which is then at rest), and when the drying time is over, the printer will automatically resume operation by measuring the colors of the dried target. Some embodiments have the option that the target may be removed after the print and later be re-inserted for the color measurement and the construction of the gamut model, in order to enable the printer to be used, e.g. for other print jobs, in the meantime.

In further embodiments, the above automatic functionality is extended such that the printer can repeatedly carry out the chain of activities mentioned above for different print-medium/colorant/print-mode combinations. In these embodiments, a user may pre-select a sequence of different print media and/or print modes, and then start the procedure. The printer will then sequentially, for all pre-selected combinations print a target, measure its colors, and form the gamut model for this combination, without user invention. In some embodiments, the user has to put the different papers according to his pre-selection into the printer's paper tray before starting the procedure. In other embodiments, the printer is equipped with an automatic print-medium-type recognition so that the user can perform the print-medium pre-selection by simply putting a pile of the different print media of interest in the paper tray. In principle, the type of colorant used might also be varied automatically, if the printer is equipped with several automatically switchable ink reservoirs. However, a printer will usually not be equipped with switchable inks so that colorant variation will typically need the colorant to be exchanged manually. The automatic production of gamut models for different print-medium/colorant/print-mode combinations enables, in some embodiments, a comparative analysis of the gamut properties of these combinations to be made.

In an embodiment, a profile is generated using the above automatic functionality, whether extended or not, whereby a generated profile is taken into account and iteratively checked and/or fine tuned for performance improvement.

As mentioned above, some embodiments have the option that an already-printed target can be inserted in the printer to measure its colors and form the gamut model. The ability to process already-printed targets also enables a target printed by another printer to be color-measured by the embedded color measurement device, and a gamut model of the other printer's color gamut to be formed by the embedded color gamut constructor. Thus, for example, some embodiments are arranged to make a comparative analysis of the gamut of the present printer and the other printer.

Up to this point, the term "gamut" has only been used in the context of a "device gamut", i.e. to characterize the range of colors that can be reproduced with the device considered (under specific printing conditions as referred above). But the term "gamut" is also meaningful in connection with an image. Such an "image gamut" characterizes the range of colors that occur in a certain image. Depending on the image considered, an image gamut may be small compared with a device gamut: for example, an image only showing human skin will only have skin tones occupying a small portion of the whole device color gamut.

Whereas the formation of a device gamut model is based on a measurement of all the colors of a target with color patches spanning all the device-color space of the printer considered, the formation of an image gamut model may analogously be based on measurement of all the colors present in the image considered. Thus, by inserting a target spanning the colors of a printed image, and only those colors, in the present printer and measuring its colors, the gamut constructor of some embodiments is able to form a gamut model of that image. The printed image may, for example, be an image printed by a third printer. Alternatively, the image may be an image represented by digital image data, and the image gamut model may be formed using the digital image data.

In some of the embodiments, the color stability of a target for a colorant/print medium combination is verified before the color gamut model is formed. This is motivated by the fact that, after a color patch has been printed on a medium, the color is generally not yet fixed or stable but may still vary (develop) due to intrinsic ink properties and physical and chemical interaction of the ink with the print medium and the atmosphere. Thus, not only the ink and the print medium, but also external parameters, such as air humidity and temperature exert an influence on the color. Hence, it is useful to have a color stability parameter that indicates the time interval after which a color may be assumed to be stable (i.e. does not change anymore, or only shows changes below a certain threshold). Depending on the nature of the color-medium interaction, color stability may also depend on the print medium used.

Therefore, in some of the embodiments device-independent color values of a set of color patches printed with the color printer are repeatedly measured, with the embedded color measurement device at different points in time. Color changes between the different points in time are calculated, and it is verified that color stability has been reached. The color gamut model for the colorant/print medium combination is then formed on the basis of a color measurement of a set of color patches which has been verified to be color-stable. The set of color patches may be a target which is finally used to form the gamut model. Alternatively, it may be a reduced set of color patches since less color gradation may be used for the stability measurement than for the gamut model construction.

In some embodiments, the verification of color stability is based on a color stability parameter. The color stability parameter is based on color changes observed between the different points in time. To obtain certain robustness against fluctuations, a determination of the color stability parameter is based on an averaging procedure, in some embodiments. For example, if one uses a hundred color patches (of the same color or different colors) as a basis for the stability verification, one assumes that color stability has been reached when the average change, averaged over the full 100-color sample, between measurements of the same color patch at different points in time (e.g. at two subsequent days) is below a threshold. Alternatively, if such an averaging procedure renders the color stability measurement too insensitive, one can require the maximum color change observed in the sample at the different points of time to be below a threshold. By means of the color-stability measurement, the system automatically knows when stability is reached for a certain print-medium/colorant combination, and can then construct the associated gamut model. One should note that other statistical means may be used instead of average, including but not limited to median, 95%, maximum, etc. . . .

Going back to FIG. 1, a color printing device 1 is schematically represented. The color printing device comprises a carriage 11. The carriage 11 is a mobile mechanical element which is controlled by a controller 12. The carriage is mobile along a direction 13 and is supported bay a rail 14. The direction 13 is called the scanning direction. The carriage may move back and forth along the scanning direction 13 according to the controller 12. The controller 12 controls the movement of the carriage 11. The position, velocity and acceleration of the carriage 11 are controlled by the controller 12. The carriage is a reciprocating carriage in so far as it may move back and forth along a scanning direction.

The carriage 13 comprises 12 ink containers 13-1 to 13-12. Each ink container is associated with a printhead or pen. In this embodiment, the inks used are liquid inks, the 12 inks being the following: MYcmRGVNnKkF (meaning, in that order, Magenta, Yellow, light cyan, light magenta, Red, Green, Violet, Grey, light grey, Black, light black, and Glossy). In this embodiment, each one of the 12 printheads is a thermal ink jet print head comprising about 1000 nozzles.

The carriage comprises a color measurement device 15. In this embodiment, the color measurement device is a spectrophotometer. In this embodiment, the spectrophotometer is of the type described for example in US published application US2005052648A. In an embodiment, the color measurement device used is a spectrophotometer using a white light source to make measurements at many wavelengths over the visible spectrum, whereby a diffraction or holographic grating separates reflected light into narrow bands of wavelengths, whereby the intensity of light in each band is measured by a linear photodiode array. In another embodiment, the color measurement device is a calorimeter. In another embodiment, the color measurement device is a calorimeter using red, green, and blue light sources (or filters) to approximate the response of human color vision.

Having a color measurement device comprised in a reciprocating carriage such as carriage 11 allows color measurements at a variety of locations along the scanning direction 13. In this embodiment, the color measurements are made on a two dimensional media 17. In this embodiment, it is intended to measure the color of a plurality of patches 17-1 to 17-$n$. In this embodiment, in order to measure the color of each patch 17-1, the two dimensional media should be moved along the direction 18 until it reaches the scanning window of the color measurement device. The scanning window of the color measurement device is the field of view described by the color measurement device when moving along the scanning direction. The direction of movement 18 of the two dimensional media 17 is called media path direction. The field of view of the color measurement device is in this embodiment the intersection of the medium with a cone having a central axis 151 which is normal to a plane defined by the scanning direction 13 and by the media path direction 18. In other embodiments, the central axis is not normal to this plane defined by the scanning direction and by the media path direction. The central axis 151 of the cone corresponding to the field of view of the color measurement device 15 is perpendicular to the media path direction 18 and to the scanning direction 13. In order to complete the color measurement on patch 17-1, the color measurement device should substantially be located above the patch 17-1 in such a way that the filed of view is comprised within the patch. This is achieved in this embodiment by a combination of movement of the two-dimensional media along the media path direction and of the color measurement device along the scanning direction.

It should be noted that such combination of relative movement between the two dimensional media and the color measurement device is submitted to a number of uncertainties including media skew or media slippage for example. Such skew or slippage may happen at printing time or at scanning time, in the same, different or opposite directions. Other sources of uncertainties include, but are not limited to, the following: media shrinking and stretching (if media is textile, this is very noticeable); mechanical errors produced for example when the carriage moves along the scan axis and stops with an error, or when the medium moves along the paper axis and stops with an error; target errors such as errors introduced by the printing application such as errors in the target position or size, scaling (for instance A to A4 automatic scaling option set by mistake), margin errors (applications often handle margins incorrectly, so the printer places the printed content slightly shifted), numerical errors such as rounding errors for instance (if an application multiplies the patch size by the number of patches in order to calculate the pattern size, it may amplify the initial patch size error: example, @300 dpi, 1 pixel error in the patch size becomes 0.2 in or 5 mm after 60 patches). Other reasons for position uncertainties include deviation of the axis of the color measurement device, or medium thickness. The possible effect of uncertainties is illustrated on FIG. 1, whereby the trajectory of the color measurement device is illustrated in two different occurrences by line 171 and line 172.

Line 172 represents the trajectory of the central axis 151 of the color measurement device 15 in one occurrence. It should be noted that when following the trajectory 172, the central axis 151 would pass by the centre line of patches 17-1 to 17-9. A measurement of the color of patch 17-9 is illustrated by reproducing the field of view 152 of the color measurement device, which is in this embodiment represented by a circle 152. This circle 152 corresponds to the intersection between the cone of field of view of the color measurement device having a central axis 151 with the two-dimensional media 17 at the moment of the measurement of the color of patch 17-9. As illustrated, the field of view 152 is well centered within patch 17-9, which implies that the measurement will be reliable. This would not be the case if, due for example to slippage of the two-dimensional media, the relative positioning between the color measurement device and the patch or patches was not as expected. Such an occurrence illustrating media slippage is illustrated by trajectory 171.

Line 171 represents the trajectory of the central axis 151 of the color measurement device 15 in an occurrence where paper slippage occurred. It should be noted that when following the trajectory 171, the central axis 151 should pass by the centre line of patches 17-1 to 17-9, but is in this case offset by the amount of slippage. It should be noted that a similar effect may be produced by other causes, such as for example a shift in the central axis 151 of the color measurement device. A measurement of the color of patch 17-7 is illustrated by reproducing the field of view 153 of the color measurement device, which is in this embodiment represented by a circle 153. This circle 153 corresponds to the intersection between the cone of field of view of the color measurement device having a central axis 151 with the two-dimensional media 17 at the moment of the measurement of the color of patch 17-7. It should be noted that in this occurrence, the circle 153 is not centered, and even includes a portion of media which is not part of the patch 17-7, having as a consequence that the measurement is at least less reliable than the measurement illustrated by circle 152.

One should note that in these embodiments, the field of view is represented by a perfect circle. This may not be the case in other embodiments. If, for example, the central axis 151 is not perfectly perpendicular to the plane defined by the two-dimensional media, the circle 152 would correspond to an elliptical shape. If, for example, the two-dimensional media has a thickness larger than represented in FIG. 1, the circle would have a smaller diameter as the distance separating the color measurement device from the patch would be shorter. It should be noted that the color measurement device may be variable in position in order to for example take media thickness into account. The shape and size of the field of view would also depend from the specific color measurement device used. The shape and size of the field of view should also be taken into account when choosing the size of the patches, in order to ensure reliability of the measurements.

In order to take such uncertainties into account, the color printing device according to the invention comprises the optical density sensor 16. The optical density sensor is comprised in the carriage 11. The optical density sensor may also be called "line" sensor.

In this embodiment, the density sensor 16 is a densitometer which returns a single value, the optical density measured at the illumination wavelength. This particular densitometer is color-blind: the amounts of ink printed in cyan and yellow patches could be chosen to give identical measured values. Simple densitometers are very economical. Such a densitometer may comprise one or more light-emitting diodes (LEDs) as well as lenses and one or more photodiode sensors. It should be noted that a colorimeter may be used as a density sensor. In the device according to the invention, the optical density sensor is a first apparatus and the color measurement device is another apparatus.

In this embodiment, the density sensor is used for detection of a variety of patterns carried by the two-dimensional media. In this embodiment, a first pattern 173 is located on the leading edge of the media. Pattern 173 comprises a network of lines which is detectable by a scan of the density sensor 16.

In this embodiment, the color measurement device is used for precisely determining the color of a specific zone, which is a typically relatively slow and static measurement. The density sensor is used differently in that its measurements are relatively faster and are relatively continuous: the density sensor measures density variations during a scan. The output of the density sensor is typically represented by a curve representing density variation against time, the time being associated to the variation of the position of the density sensor during a scan, whereas the output of the color measurement device is a set of numbers which represent spectral values associated to the color of the patch on which the measurement was made.

Detection of pattern 173 may for example be communicated via controller 12 to a processor. Such information allows gaining knowledge related to the relative positioning between the carriage and the media. Indeed, if the distance along the media path direction separating the patches from the pattern 173 is a given, the detection of the pattern 173 by the density sensor 16 allows to guess the position of the patches.

Figure 2A:
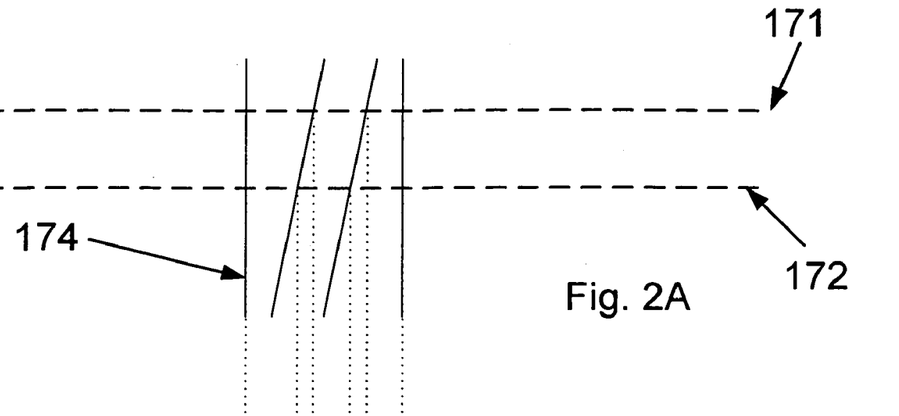
FIGS. 2A-C illustrate the output of a pattern scan with the optical density sensor, according to embodiments of the invention.
Figure 2B:
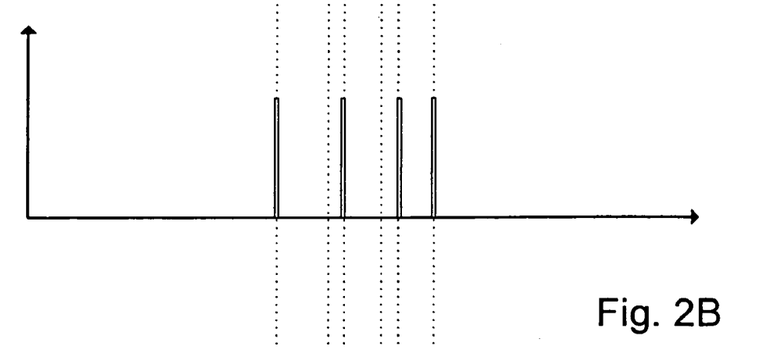
Figure 2C:
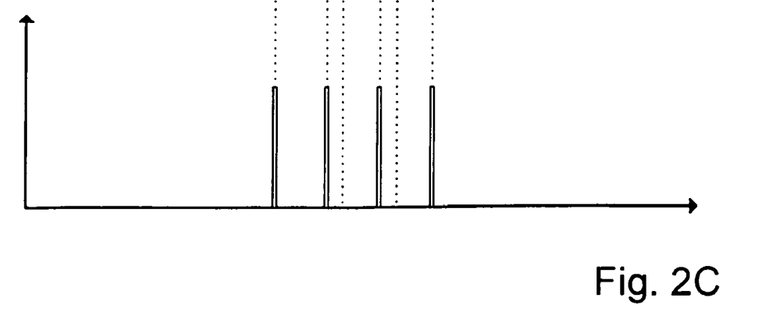

In this embodiment, the media also carries a pattern comprising pattern 174. The pattern 174 comprises 4 segments, two of which being substantially parallel to the media path direction, and two of which being at an angle to the media path direction. Other embodiments include but are not limited to: 2 lines being one parallel and one oblique, 3 lines by adding a further parallel one in order to gain tolerance to scaling, or the 4 line proposed above which provide the advantage of redundancy. A specific zone of FIG. 1 is blown up and illustrated in FIG. 2A. In FIG. 2A the pattern 174 is reproduced together with scanning line 171 and scanning line 172. In FIG. 2B, the output of the optical density sensor is reproduced which corresponds to a scan along line 171. In FIG. 2C, the output of the optical density sensor is reproduced which corresponds to a scan along line 172. Each of FIGS. 2B and 2C exhibits four peaks corresponding to the density sensor scanning each of the four segments. On FIG. 2C, these 4 peaks are evenly spaced, whereas these four peaks are not evenly spaced on FIG. 2B. The skilled man derives from this information and from the shape of the pattern 174 that the scanning line 172 is centered whereas the scanning line 171 is off center in relation to the pattern 174. Considering that in this embodiment each pattern 174 is placed aligned with a line of patches 17-1 to 17-9 or 17-10 to 17-n, this information may be used to compensate for, for example, slippage, in that misplacement may be compensated in order to obtain an appropriate color measurement by the color measurement device.

Figure 3:
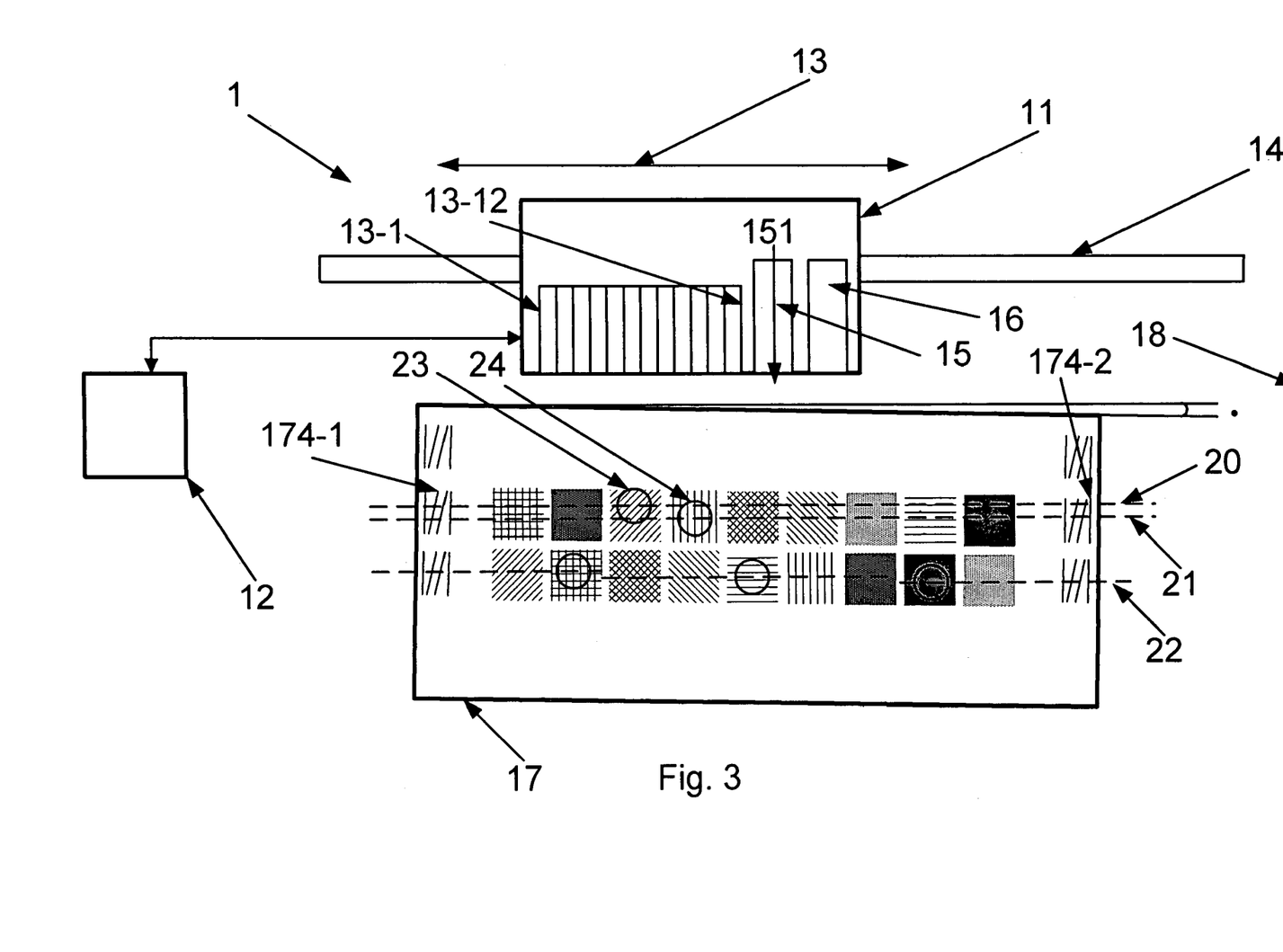
FIG. 3 illustrates a printing device with a reciprocating carriage having an embedded color measurement device and an optical density sensor, according to embodiments of the invention.

In FIG. 3, the same device as in FIG. 1 is represented. In FIG. 3, there is no pattern 173 placed at the leading edge of the media. In FIG. 3, the media is loaded in the device at an angle θ to the ideal media path direction. This angle is due to media skew. This is typical of a situation where the user loaded the media by hand into the device. In this embodiment, the carriage 11 scans along the line 20. As a result of the scan along the line 20, the optical density sensor provides information relating to the scan of pattern 174-1 and 174-2 (such information may be represented in a manner similar to FIG. 2B or 2C). A skilled man can derive the value of the angle θ from the information relating to the scan of patterns 174-1 and 174-2 by the density sensor. The skilled man can also derive the relative position of the patches from such information. The calculation of the angle and of the relative position may be provided by means of a program run on a processor. Following these deductions, an improved scanning line 21 is proposed and followed by the carriage. The improvement in measurement reliability is illustrated by comparing the field of view 23 obtained by the "non corrected" scan along scan line 20 to the field of view 24 obtained by the "corrected" scan along scan line 21. In this case, field of view 24 is better centered that field of view 23. This improvement in centering the field of view is in this embodiment obtained by correcting the scan line such that the middle of the scan line passes by the middle of the line of patches. If the skew angle is large, such a correction may not be sufficient, and another "corrected" scan line 22 is illustrated in FIG. 3. Scan line 22 comprises three steps which allow an improved scan of the line of patches which better suits the skew angle. Such corrected scan lines may be obtained by movement of the media along the media path direction by means of a media drive mechanism which does not appear on the Figures.

The synergy between the reciprocating optical density sensor and the reciprocating color measurement device thus leads in this embodiment to compensating uncertainties which may for example be introduced by a user or be inherent to the device.

The use of such a color measurement device/optical density sensor combination allows an improvement in measurement reliability. The use of such a combination also allows the use of different requirement for the size and positioning of the color patches, whereby an improvement in positioning accuracy allows use of patches having a reduced surface area, leading to an increase in scanning speed or to savings in the quantity of media or inks used.

Figure 4A:
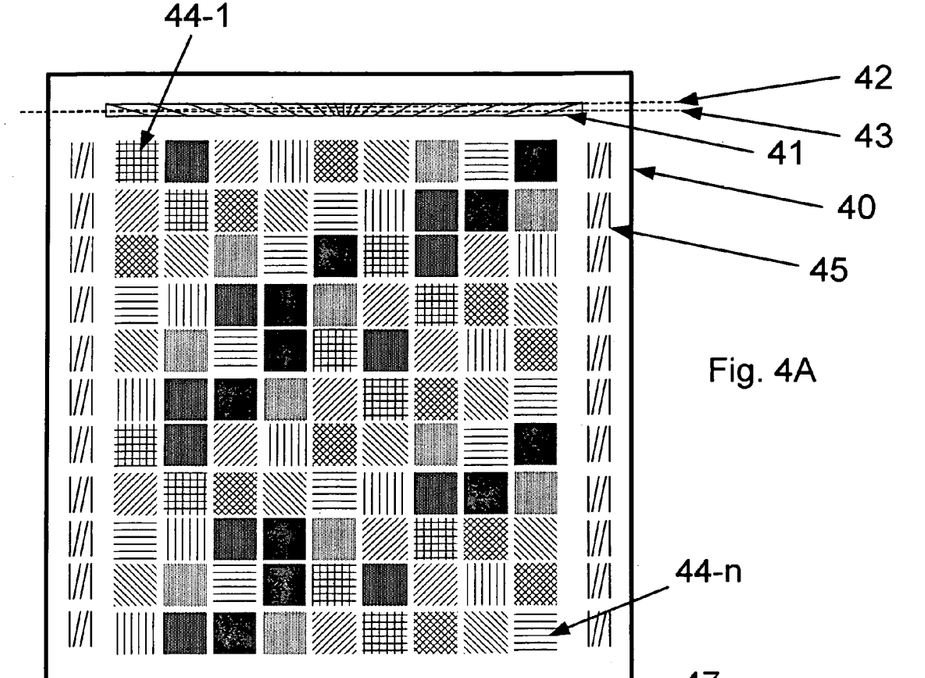
FIGS. 4A-B illustrate two dimensional media according to embodiments of the invention.
Figure 4B:
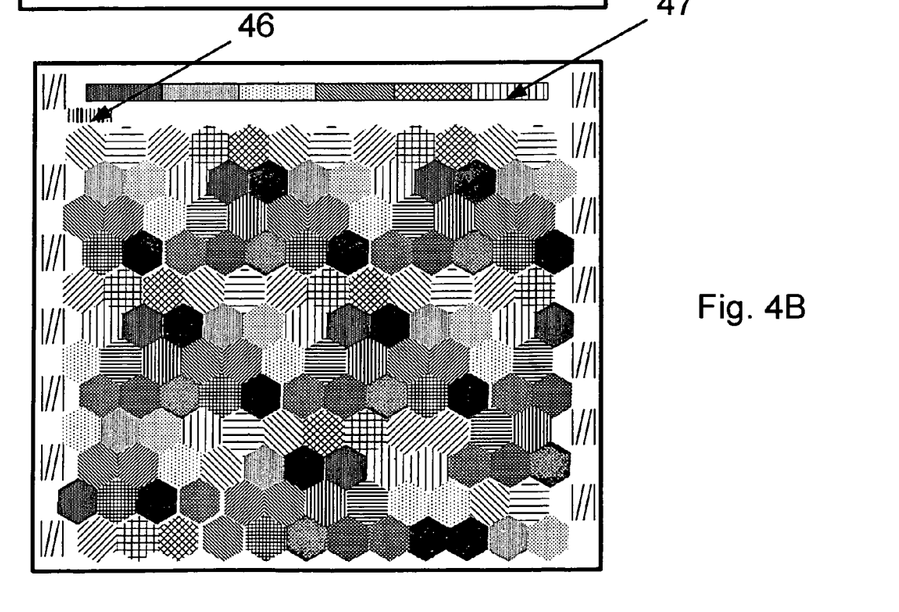

FIGS. 4A and 4B represent two embodiments of a two dimensional media for use with the device or in the method of the invention.

In FIG. 4A, the media sheet 40 carries a pattern 41 located at a leading edge of the media sheet. A leading edge is an edge of the sheet parallel to the scanning direction when the media is loaded into a device. A leading edge differs from a side of the media, a side being an edge of the media parallel to the media path direction when inserted in a device. In this embodiment, the pattern 41 was printed in black ink and is designed to be scanned by the optical density sensor in order to provide information on the position of the carriage in relation to the media. The set of oblique segments is designed in such a manner that an analysis of the output of a scan by the density sensor will provide this relative positioning information. As illustrated, a scan along line 42 would differ from a scan along line 43, each scan allowing estimating skew angle or displacement along the media path direction.

In FIG. 4A, the media sheet also carries numerous color patches 44-1 to 44-n (one should note that even though the patches are represented with a variety of black on white fillings, the patches would normally be homogeneous color patches, each patch representing a particular color). Such patches typically represent a gamut, being for example a device gamut or an image gamut. Even though a plurality of patches is represented, the invention may be applied to a two dimensional media carrying a single patch.

Such patch or patches may have been produced by the printing device of the invention. The patch or patches may also have been produced by another device.

Production of such patches requires ink usage, media usage, as well as time. This implies that for reasons of ink, media and time economy it is of interest to a user to produce as many patches as possible on the smaller surface as possible. This should be done while keeping in mind the requirements of the color measurement device, in so far as the surface of a single patch should be at least larger than the corresponding field of view of the color measurement device, taking positioning uncertainties into account. Considering the reduction of position uncertainties provided by the invention, use of the invention allows use of relatively "smaller" patches.

The media of FIG. 4A also carries a pattern 45, the pattern 45 being located on each side of the media sheet, the pattern 45 comprising a repetition of a 4 segment sub-pattern, each 4-segment sub-pattern being aligned with a line of patches. In this embodiment, each line of patches is associated with two sub-patterns, allowing regular checking before and after scanning each patch line the relative positioning between the media and the carriage.

The media of FIG. 4B is similar to the media of FIG. 4A. The media of FIG. 4B carries a warm-up pattern 47 which is used for print-head warm-up. One difference between the media of FIG. 4A and the media of FIG. 4B is the fact that the patches have a hexagonal shape, which allows both a better fit with the typical shape of the field of view of a color measurement device as well as a more efficient "packing" of patches on a given surface area. In order to render the patch packing even more efficient, only one sub-pattern is associated to each patch line in the embodiment described in FIG. 4B. In FIG. 4B, the media also carries information encoding pattern 46 which in this embodiment is in barcode form. Such information encoding pattern 46 may be read for example by the optical density sensor and may encode metadata, that is, information related to the type of media used, the print mode used for printing the patch or patches, the type or set of inks used for printing, the time and date at which the print was produced, to the type or to the specific printing device used for producing the patch or patches, the type of measurements to take, etc. . . . This metadata can later be attached to the color measurements obtained from the print.

In the embodiment of FIGS. 4A and 4B, square or hexagonal patches are illustrated, but other types of shapes may be used including but not limited to round or polynomial shapes.

One should note that a difference between the embodiment of FIG. 4A and the embodiment of FIG. 4B is the organization of the patches in the chart, whereby the "measurement stops" (corresponding to the centers of the patches) are arranged differently, being a rectangular array in 4A and a bee-nest array in 4B.

Figure 5:
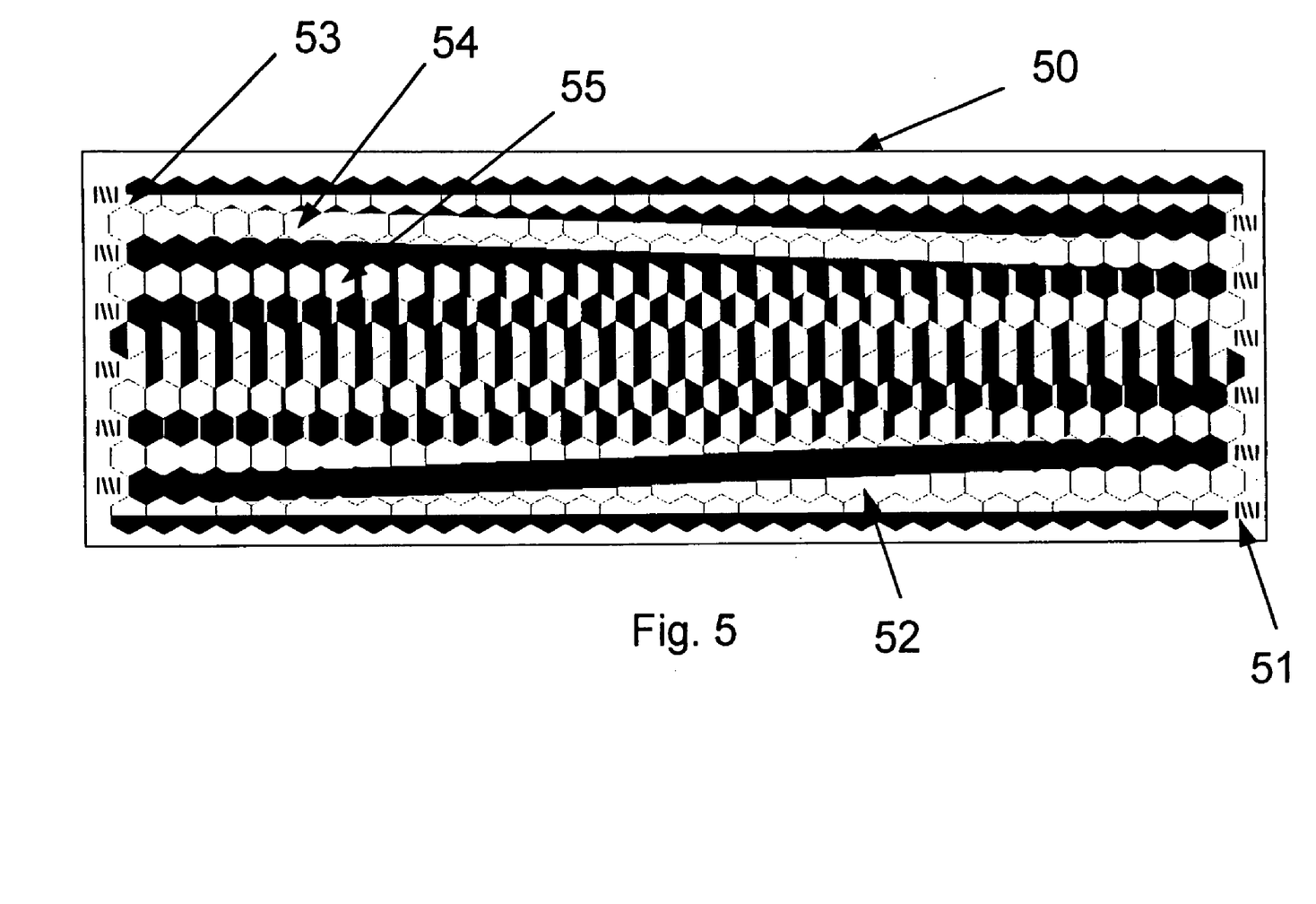
FIG. 5 illustrates a two dimensional media, according to embodiments of the invention.

In FIG. 5, a further two-dimensional media 50 is represented. In FIG. 5, media 50 carries a pattern 51 comprising a repetition of a 4 segment sub-pattern as well as an array of black and white hexagonal patches 52. This type of array of black and white hexagonal patches may be useful in calibrating the color sensor. The scan provides information on the accuracy of the positioning of the color measurement device over the color patches, as well as on its field of view.

For example, the first line 53 of hexagonal patches being formed of 50% black and 50% white, a properly positioned color sensor will return the same value for each patch measurement. A variation in the measurements would suggest a misplacement of the color sensor. The second line 54 provides information on the size of the field of view of the color measurement device by detecting the "upper" limit of the field of view. One should also note that saturation should be reached on both sides ("full" white and "full" black), thus confirming that the patch size is smaller than the field of view. Between saturations, the 50% point may be extracted for each scan of a line of patches and analyzed in order to deduce a vertical and a horizontal overall error. The fourth line for example 55 provides information on the size of the field of view of the color measurement device by detecting the "side" limit of the field of view. Such types of information are completed by redundant or inverted patch lines.

Figure 6:
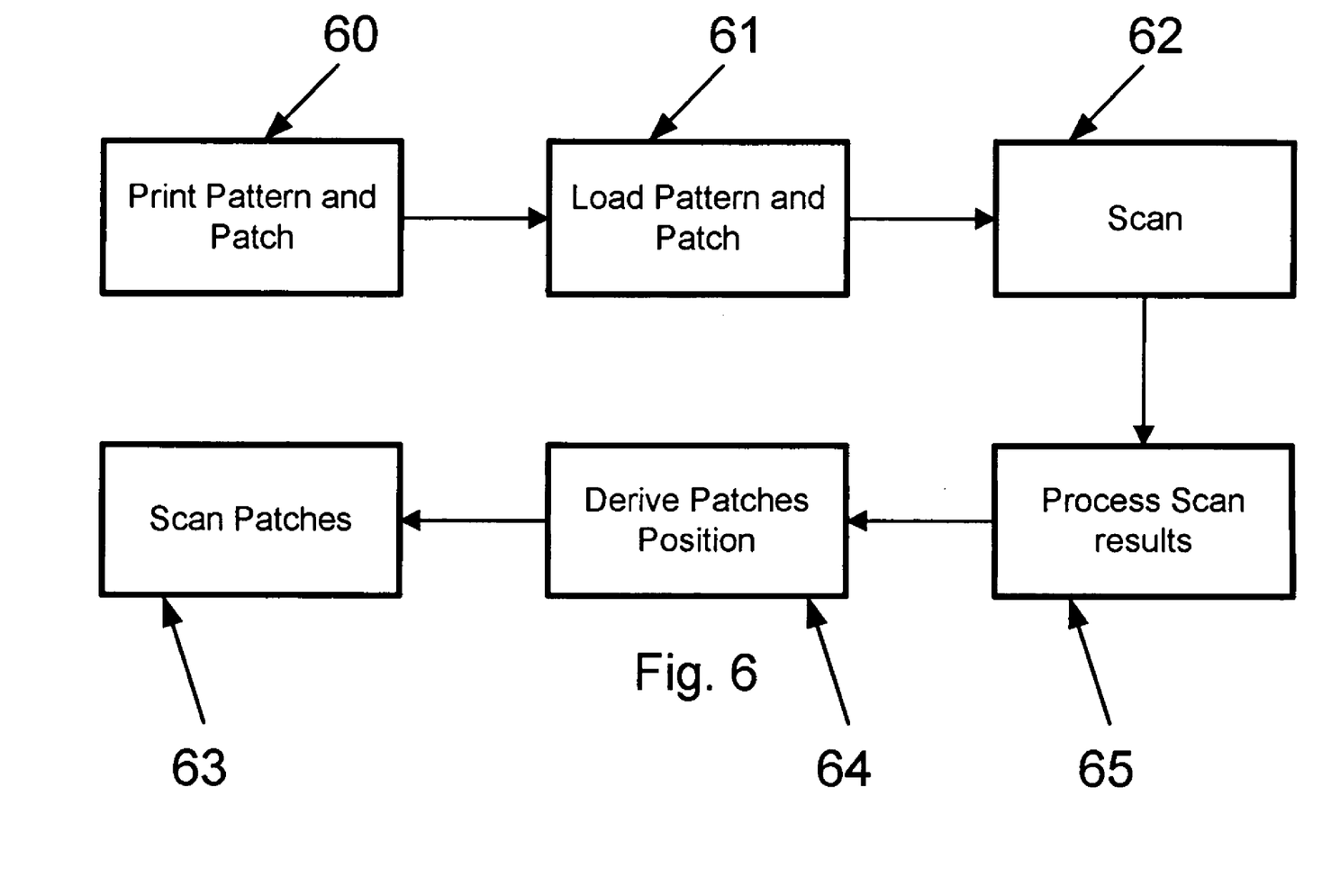
FIG. 6 is a flow chart illustrating a color measurement method, according to embodiments of the invention, The drawings and the description of the drawings are of embodiments of the invention and not of the invention itself.

In FIG. 6, an embodiment of a method according to the invention is schematically represented by a block diagram.

As represented, a pattern and a patch or patches are printed on a two-dimensional media in step 60. In an embodiment, a plurality of patches are printed which are organized in an array. In an embodiment, the pattern comprises sub-pattern element, whereby the sub-pattern elements are aligned with a line or a column of the array. In an embodiment, the pattern is printed in black. In an embodiment, a plurality of patches is printed, the plurality of patches representing an organized sampling of a device color space. In an embodiment, the pattern and the patches are printed by a printer. In an embodiment, the pattern and the patches are printed by a press.

As represented in FIG. 6, the pattern and patch or patches are loaded in step 61. The pattern and patches may be loaded directly after being produced. The pattern and patches may be loaded after a drying time. The pattern and patches may be loaded by hand. The pattern and patches may be loaded automatically, for example using a media drive mechanism. The pattern and patches may be loaded partially by hand and partially automatically. The pattern and patches may be loaded into a printer comprising a color measurement device and a density sensor. The pattern may be loaded onto a dedicated measurement device, whereby the dedicated measurement device is not a printer but does comprise a color measurement device and a density sensor, which may be provided on a reciprocating carriage.

As illustrated in step 62, a scan is starting. In an embodiment, the scan in step 62 is made using the optical density sensor, whereby the optical density sensor scans the pattern or a part of the pattern. As illustrated in step 65, the output of the optical density sensor or scan result is processed, typically by a processor, in order to provide information on the relative positioning between the pattern and the optical density sensor, and thereby allow for deriving information related to the position of the patches in step 64 thereby allowing for appropriate scan of the patches by the color measurement device as illustrated in step 63.

In an embodiment, the method of the invention is realized using a handheld device, the handheld device including an optical density sensor and a color measurement device, whereby the handheld device is used either directly by a user of whereby the handheld device is placed on a stand in order to facilitate positioning of the handheld device.

In an embodiment, the method of the invention is realized using an optical density sensor which is also used as a color measurement device. This optical density sensor/color measurement device may be a calorimeter.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A color printing device, comprising: a reciprocating color measurement device and a reciprocating optical density sensor, wherein the optical density sensor is configured to identify a two-dimensional position of a pattern on a two-dimensional media, the pattern spaced at a separate, predetermined two-dimensional position relative to a color patch on the media, the color patch being separate and distinct from the pattern, and the two-dimensional media having an intervening space between the color patch and the pattern, and wherein the pattern includes a plurality of line segments, at least one of the plurality of line segments substantially parallel to a media-path direction, and at least on other of the plurality of line segments oblique to the media-path direction.

2. A color printing device according to claim 1, wherein the color measurement device and the optical density sensor reciprocate along the same reciprocating direction.

3. A color printing device according to claim 2, further comprising: a media advance mechanism for advancing a media in a media-path direction, and wherein the reciprocating direction is transverse to the media-path direction.

4. A color measurement method comprising the following steps:

identifying a two-dimensional position of a pattern on a two-dimensional media using a mobile optical density sensor, wherein the pattern includes a plurality of line segments, at least one of the plurality of line segments substantially parallel to a media-path direction and at least one other of the plurality of line segments oblique to the media-path direction;

deriving a two-dimensional position of a color patch on the media from the two-dimensional position of the pattern, the color patch being separate and distinct from the pattern, and the two-dimensional media having an intervening space between the color patch and the pattern; and measuring a color of the color patch using a color measurement device.

5. A method according to claim 4, wherein the optical density sensor and the color measurement device are comprised in a printing device.

6. A method according to claim 5, wherein the color patch is printed by the printing device.

7. A method according to claim 5, wherein the color patch is printed by another printing device.

8. A method according to claim 4, comprising the step of deriving the position of a plurality of color patches on the media from the position of the pattern.

9. A method according to claim 4, wherein the plurality of color patches forms an array.

10. A method according to claim 8, wherein at least some patches have a polygonal perimeter comprising at least 5 sides.

11. A method according to claim 4, wherein the pattern is located towards a side of the media.

12. A method according to claim 4, wherein the pattern is located towards a leading edge of the media.

13. A method according to claim 4, wherein the pattern comprises a repetition of a sub-pattern.

14. A method according to claim 4, wherein the optical density sensor is a first device and the color measurement device is a second device different from the first device.

15. A method according to claim 14, wherein the optical density sensor and the color measurement device are mechanically coupled.

16. A color measurement method, comprising:

identifying a two-dimensional position of a pattern on a two-dimensional media using a mobile optical density sensor, the pattern including a plurality of line segments, at least on the plurality of line segments substantially parallel to a media-path direction, and at least one other of the plurality of line segments oblique to the media-path direction:

determining a correction for any of media skew, misalignment, slippage, and scaling in response to the two-dimensional position of the pattern on the media;

deriving a two-dimensional position of a color patch on the media from the two-dimensional position of the pattern and the correction, the color patch being separate and distinct from the pattern, and the two-dimensional media having an intervening space between the color patch and the pattern; and measuring a color of the color patch using a color measurement device.

17. A method according to claim 16, wherein the color measurement device is a spectrophotometer.

18. A method according to claim 17, wherein the optical density sensor is a densitometer.

19. A method according to claim 17, wherein the pattern further comprises a repetition of a sub-pattern.

* * * * *

UNITED STATES PATENT AND TRADEMARK OFFICE
CERTIFICATE OF CORRECTION

PATENT NO.       : 8,203,749 B2
APPLICATION NO.  : 11/453973
DATED            : June 19, 2012
INVENTOR(S)      : Jordi Vilar et al.

It is certified that error appears in the above-identified patent and that said Letters Patent is hereby corrected as shown below:

In column 12, line 50, in Claim 1, after "pattern," delete "and".

In column 12, line 54, in Claim 1, after "least" delete "on" and insert -- one --, therefor.

In column 12, line 60, in Claim 3, after "advancing" delete "a" and insert -- the --, therefor.

In column 12, line 61, in Claim 3, after "media in" delete "a" and insert -- the --, therefor.

In column 13, line 23, in Claim 9, delete "claim 4," and insert -- claim 8, --, therefor.

In column 13, line 32, in Claim 13, after "pattern" insert -- further --.

In column 14, line 11, in Claim 16, delete "on the" and insert -- one of the --, therefor.

Signed and Sealed this
Eighth Day of January, 2013

David J. Kappos
*Director of the United States Patent and Trademark Office*